Sept. 29, 1964　　　　J. BOSSE ETAL　　　　3,151,108
KRYPTOESCIN AND PROCESS OF MAKING SAME
Filed Nov. 18, 1960
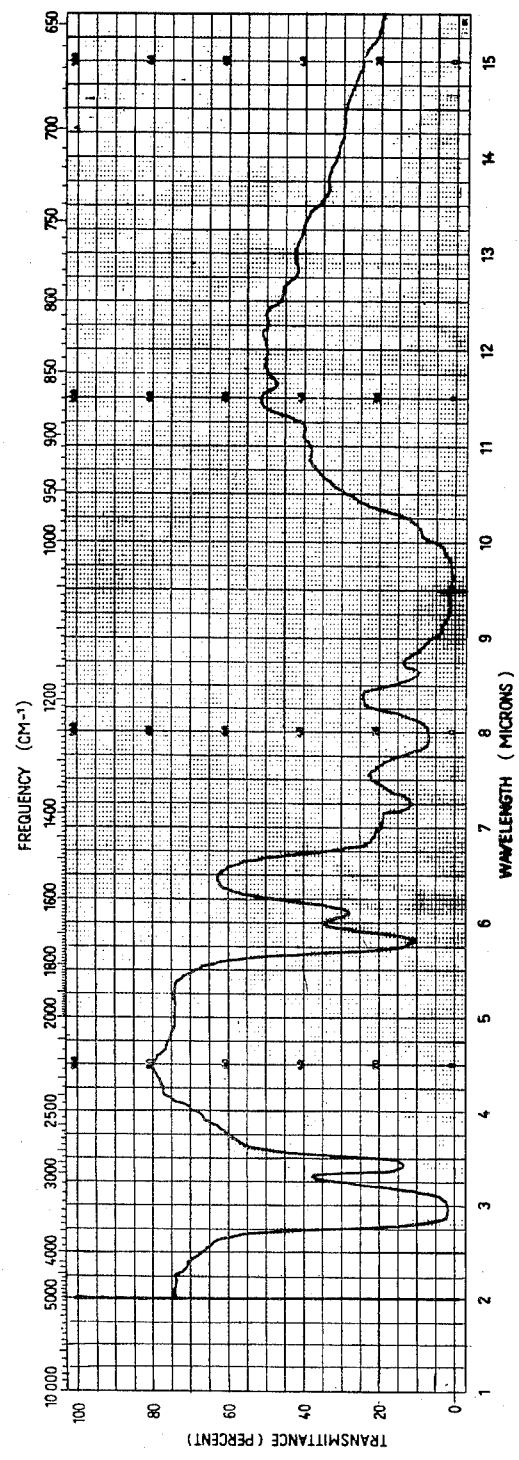
INVENTORS:
JOACHIM BOSSE
　　　ET AL.
BY
　　AGENT 3,151,108
KRYPTOESCIN AND PROCESS OF MAKING SAME
Joachim Bosse and Josef Wagner, Munich, and Fritz Wojahn, Berlin, Germany, assignors to Chemisch-Pharmazeutische Fabrik Adolf Klinge & Co., Munich, Germany, a corporation of Germany
Filed Nov. 18, 1960, Ser. No. 70,342
Claims priority, application Germany Nov. 20, 1959
3 Claims. (Cl. 260—210.5)

This invention relates to a novel saponin and more particularly to a therapeutically highly effective saponin, and to a process of isolating this novel saponin from extracts of parts, particularly the seeds, of the horse chestnut tree.

Heretofore, it has been believed that the therapeutic effect of horse chestnut extracts administered per os, is based on the saponin content of these extracts. More recently it has been found that, on removal of the hemolytically acting saponins from horse chestnut extracts, which saponins prevent parenteral administration of such extracts, the resulting treated extracts produce not only the valuable therapeutic effects of the original saponin-containing extracts, but have also valuable additional effects when injected.

It is one object of the present invention to provide a new and valuable, therapeutically effective saponin from extracts of parts of the horse chestnut tree which saponins are substantially free of hemolytic effects and can safely be administered to humans and animals.

Another object of the present invention is to provide a simple and effective process of isolating and recovering such a new and valuable substantially non-hemolytic saponin from extracts of parts and especially of seeds of the horse chestnut tree.

Still another object of the present invention is to provide a simple and effective process of separating two forms from said saponin as isolated according to the present invention.

A further object of the present invention is to provide new and valuable therapeutic compositions containing said substantially non-hemolytic saponin from extracts of parts of the horse chestnut tree.

Other objects of the present invention and advantageous features thereof will become apparent as the description proceeds, taken in conjunction with the accompanying drawing wherein FIG. 1 is a chart showing the curve of the infrared spectrum of kryptoescin.

The present invention is based on the finding that the aqueous-alcoholic, or aqueous, extracts of parts, especially of seeds of the horse chestnut tree contain, after precipitation of the hemolytically acting saponins preferably by treating the extract with cholesterol and separating by filtration the precipitate formed in said treatment, another saponin-like compound which is not precipitated by means of cholesterol. This saponin can be isolated and recovered by treating said extract with an acid and, if desired, with an aliphatic alcohol or ketones, or with halogenated hydrocarbons which are immiscible, or only partly miscible with water, particularly with mixtures of such halogenated hydrocarbons with said alcohols and ketones.

The other ingredients of the horse chestnut extract, for instance, the flavones, remain in solution in the solvent. They are free of all compounds of the saponin-type while the novel saponins are recovered as such free of said known other hemolytically active saponins.

Said new saponin according to the present invention exists in two forms. In its one form it is entirely free of any hemolytic effect, i.e. breakdown of the blood corpuscles, and in its other form it is free of harmful hemolytic effects upon injection of their solutions into the blood vessels.

Said new saponin which is soluble in water, will be designated hereinafter in the specification and in the claims annexed hereto as "kryptoescin." The form which is free of hemolytic activity is designated as "kryptoescin A," and the slightly hemolytic form into which kryptoescin A can be converted is designated as "kryptoescin B."

Upon injection of solutions of kryptoescin into the human body no harmful hemolytic effects are observed. It has been found that kryptoescin has a pronounced effect on the vascular system and has also a diuretic and antihistaminic activity. In therapy it has proved to be of value as antiedematous agent in the treatment of lung edema, brain edema, edema of the soft parts of the body caused by injuries, fractures, operations, and the like, inflammatory edema such as encountered in thrombophlebitis, and others. It is administered to the human organism according to conventional methods and preferably parenterally.

As stated above, the new saponin kryptoescin exists in a non-hemolytic, water-soluble form which is designated hereinafter and in the claims as "kryptoescin A" and in a second form designated as "krytoescin B" which is also water-soluble but has a slight but harmless hemolytic effect. It is an isomer of kryptoescin A. Conversion of kryptoescin A into kryptoescin B takes place gradually by simply dissolving it in water. Such conversion is accelerated by increasing the temperature and/or decreasing the pH-value of the solution. At room temperature, such as at 15° C. to 20° C., and at a pH between 6.0 and 7.0 kryptoescin A is stable in aqueous solution for a prolonged period of time.

The new kryptoescins are similar in their constitution to escin, the saponin found in horse chestnut extracts. The theory is advanced without, however, being limited thereto that kryptoescin A is a glycoside, the aglucone of which differs from that of escin by the absence of a double bond between the carbon atoms 12 and 13. Kryptoescin corresponds to the formula

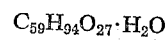

Its molecular weight is 1253.4. It differs from the saponin escin by containing one mole or arabinose. Its structural formula is based on the escigenin molecule and contains, isolated as cleavage products, arabinose, xylose, glucose, and glucuronic acid and an acetyl group as well as an α-methyl-β-hydroxy butyric acid group most probably attached thereto in ether bondage. The position of the substituents is not yet exactly determined. The kryptoescins may be illustrated by the following formula:

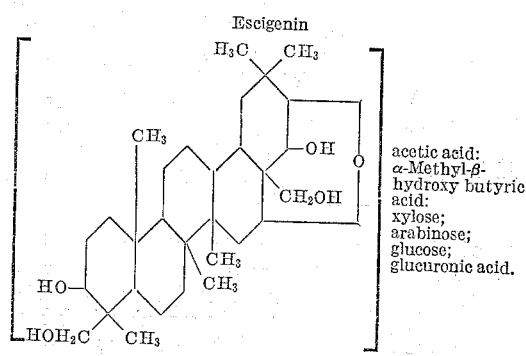

Kryptoescin A has a melting point of 218–220° C. Kryptoescin B, which is obtained without change of the molecular weight by isomerization upon heating in aqueous solution, has a melting point of 220–221° C.

Aqueous kryptoescin solutions can be used as such for therapeutic purposes. Or they can be added to horse chestnut extracts and especially to horse chestnut extracts from which the saponins precipitating with cholesterol have been removed. Thereby, the therapeutic activity of said extracts is considerably improved.

It is also possible to use horse chestnut extracts which have been freed of all the saponins including the kryptoescins for those therapeutic purposes where only the therapeutic effects of the remaining active ingredients of the horse chestnut extracts, for instance, those of their flavone compounds are desired. Such saponin- and kryptoescin-free horse chestnut extracts and their preparation are also important features of the present invention.

In principle, the process according to the present invention consists in first precipitating the saponins which are precipitable by the addition of cholesterol, removing the precipitate from the horse chestnut extracts, and then adjusting the pH-value of the filtered extract by acidifying it to a pH of 2.0 or lower.

The resulting precipitate is mechanically separated from the liquid, for instance, by centrifuging. If desired, it is purified by recrystallization from a suitable solvent.

According to a preferred embodiment of the invention, the extract containing the precipitated kryptoescin is treated with an organic solvent which is immiscible or only partly miscible with water, and the resulting solution in said organic solvent is separated from the extract. On evaporating the solvent, the dissolved kryptoescin is recovered.

According to another embodiment of the present invention the horse chestnut extract is acidified to a less acid pH-value which does not cause formation of a visible precipitate, and the resulting extract is then treated with a water-immiscible, or partly miscible, solvent to dissolve the kryptoescin and to extract it therefrom.

According to a further embodiment of the present invention a horse chestnut extract is used as starting material from which other accompanying substances, such as flavone glycosides, have been removed by a treatment with aluminum oxide and by complete demineralization of the extract by means of cation exchange agents.

Thus, horse chestnut extracts can be produced which are either completely free of saponins or which are freed therefrom to the desired extent. The therapeutically effective kryptoescin which does not cause harmful hemolysis upon injection into the blood stream can be used as such. Its isolation permits administration in exactly predetermined dosage. Its addition to horse chestnut extracts which are free of cholesterol-precipitable saponins allows to increase the kryptoescin content in such extracts to the desired extent.

In carrying out the process according to the present invention, organic water-immiscible solvents can be used, especially solvents which are liquid under normal conditions and consist of monovalent aliphatic alcohols, such as n-butanol, iso-butanol, n-amyl alcohol, iso-amyl alcohol, hexyl alcohol, and heptyl alcohol, water-immiscible ketones such as methyl ethyl ketone, diethyl ketone, water-immiscible halogenated hydrocarbons containing up to two carbon atoms especially in mixture with aliphatic alcohols or ketones containing up to three carbon atoms.

The following examples serve to illustrate the present invention without, however, limiting the same thereto.

EXAMPLE 1

100 g. of cholesterol dissolved in 1000 cc. of ether are added to 10 l. of a 10% aqueous extract of horse chestnuts prepared in the conventional manner. The ether is removed by evaporation. The saponin which has a hemolytic effect upon injection into blood vessels, precipitates and is separated by centrifuging. The residual liquid has substantially no hemolytic effect. It is of bitter taste and has some foaming power. On acidifying said residual extract by the addition of sulphuric acid to a pH of 2.0, a precipitate of kryptoescin A is formed, which is recovered by centrifuging. Further amounts of kryptoescins which are still present in the solution are extracted by shaking with n-butanol.

Flavonol glycosides are separated from the precipitate and the extracts by a treatment with aluminum oxide. For further purification the organic solvent solutions are carefully washed with water. Small amounts of residual colored impurities are removed by a treatment with animal charcoal in methanol solution. After purification with aluminum oxide, the aqueous saponin solution is demineralized by a treatment with a cation exchange agent.

Pure kryptoescin is finally extracted from the resulting acid aqueous solution by means of a water-immiscible or partly miscible organic solvent.

The hemolytic index (HI) of kryptoescin is very low. The HI of kryptoescin A is zero. Its toxicity is lower than that of the saponins of horse chestnut extracts which form a precipitate with cholesterol, but its $DL_{50}$ toxicity value is so low that it can be administered without any danger.

The following table shows the hemolytic index and the toxicity of various preparations obtained from horse chestnut extracts.

*Hemolytic Index and $DL_{50}$, Determined 24 Hours After Administration*

| | HI | $DL_{50}$, mg./kg. |
|---|---|---|
| Horse chestnut extract | 1:6,000 | |
| Kryptoescin A | 1:0 | 195 |
| Kryptoescin B | 1:6,000 | 160 |
| Saponin precipitable with cholesterol (escin) | 1:30,000 | 32 |

Pharmacological investigation of kryptoescin A and kryptoescin B shows a pronounced effect on the vascular system, a considerable diuretic effect, and an antihistaminic effect.

EXAMPLE 2

An extract of horse chestnuts was treated with cholesterol and acidified to a pH of 2.0 by the addition of sulphuric acid. The resulting precipitate was separated by centrifuging. The supernatant liquid was extracted four times with 200 cc. each of n-butanol. The separated precipitate was then dissolved in the combined n-butanol extracts. The solution was washed four times with 100 cc. each of water in order to remove the mineral acid.

Flavonol glycosides were removed from the solution by a treatment with aluminum oxide of the neutral type as sold by the firm Woelm, Germany.

After distilling off the butanol in a vacuum, the residue was dissolved in 400 cc. of water and was passed through 40 cc. of the cation exchange resin sold under the trade mark "Dowex 50 x–4."

Kryptoescin was extracted with n-butanol from the resulting acid solution. The solvent was evaporated in a vacuum, the residue was dissolved in 200 cc. of methanol, the solution was decolorized by means of animal charcoal and was then evaporated to dryness in a vacuum.

The flavonol glycosides adsorbed by the aluminum oxide were eluated by means of dilute sulphuric acid and were purified by way of their lead salts. The flavonol glycosides freed of lead are readily soluble in water.

No components of horse chestnuts could be recovered from the cation exchange resin because said resin retains cations only.

Yield: 10.5 g. of kryptoescin A.
Properties:
  Melting point (of the acid): 218–220° C.
  Melting point (sodium salt): 255–257° C.
$(\alpha)_D^{27} = 7.9°$; $Rf = 0.5$; $HI = 1:0$.

Kryptoescin A is a white, amorphous, hygroscopic powder of strong bitter taste. It has an irritating effect upon mucous membranes. It is readily soluble in methanol, moderately soluble in water and ethanol, poorly soluble in acetone, and insoluble in ether and hydrocarbons. On shaking its aqueous solution produces a strong foam even at a dilution of 1:20,000. The compound precipitates from moderately dilute solutions at a pH of 2.0, but such precipitation does not take place in the presence of cholesterol-precipitable saponin in the solution. Its formula given hereinabove shows that it is composed of escigenin which has attached thereto α-methyl-β-hydroxy butyric acid, acetic acid, arabinose, xylose, glucose, and glucuronic acid. It contains one mole of water.

*Analysis of the compound isolated from its aqueous solution.*—$C_{59}H_{94}O_{27} \cdot H_2O$; molecular weight: 1253.4. Calculated: 56.55% C.; 7.72% H. Found: 56.54% C; 7.74% H.

*Determination of its equivalent weight.*—1000 g. require for saponification 23.90 cc. of N/10 sodium hydroxide solution. Equivalent weight: Calculated, 417.8; found, 418.5. Molecular weight: Calculated, 1253.4; found, 1255.5.

Kryptoescin B is prepared by dissolving kryptoescin A in water and heating the solution.

EXAMPLE 3

10 g. of kryptoescin prepared as described in Example 2, are dissolved in 250 cc. of water. The solution is heated under reflux in boiling water for one hour. After cooling, the solution is evaporated to dryness in a vacuum.

Yield: 10 g.
Properties:
  Melting point (acid): 220–221° C.
  Melting point (sodium salt): 255–257° C.
  $(\alpha)_D^{27} = 10.7°$; $Rf = 0.5$; $HI = 1:6000$.

All other properties of kryptoescin B are the same as those of kryptoescin A.

*Analysis of the compound isolated from its aqueous solution.*—$C_{59}H_{94}O_{27} \cdot H_2O$; molecular weight: 1253.4. Calculated: 56.55% C; 7.72% H. Found: 56.89% C; 7.73% H.

*Determination of its equivalent weight.*—1000 g. require for saponification 23.90 cc. of N/10 sodium hydroxide solution. Equivalent weight: Calculated, 417.8; found, 418.5. Molecular weight: Calculated, 1253.4; found, 1255.5.

The same kryptoescinol is obtained on saponification of kryptoescin A and kryptoescin B.

EXAMPLE 4

10 g. of kryptoescin prepared according to Example 2 were dissolved in 250 cc. of water. 50 cc. of a 4% sodium hydroxide solution were added and the solution was then heated to boiling under reflux for one hour. The turbid, hot solution was filtered and then strongly acidified by the addition of hydrochloric acid. The voluminous precipitate was separated by centrifuging and washed with water until no more mineral acid could be detected. After drying, the precipitate was dissolved in 200 cc. of methanol and purified by treatment with animal charcoal. After removal of the methanol, the residue was dried.

Yield: 8.6 g.
Properties:
  Melting point (acid): 230–231° C.
  Melting point (sodium salt): 257–260° C.
  $(\alpha)_D^{27} = 13.5°$; $Rf = 0.32$; $HI = 1:0$.

The compound corresponds in all its other properties to those of escinol.

It is composed of escigenin, arabinose, xylose, glucose, and glucuronic acid, and contains water when isolated from its aqueous solution.

*Analysis.*—$C_{52}H_{84}O_{24} \cdot H_2O$; molecular weight: 1111.3. Calculated: 56.22% C; 7.80% H. Found: 55.95% C; 7.89% H.

*Determination of its equivalent weight.*—1000 g. require 9.00 cc. of N/10 sodium hydroxide solution. Equivalent weight: Calculated, 1111.3; found, 1111.1.

The rotatory power of kryptoescin A is −7.9° and that of kryptoescin B −10.7°.

In order to determine said rotatory power, 1.25 g. of the compound are dissolved in absolute methanol and diluted to 25 cc. The rotatory power values are averaged from 10 individual determinations (length of the cuvette: $l = 2$ decimeters) and the specific rotation was calculated from the formula $$(\alpha)_D^{t°} = \frac{a \times 100}{l \times c}$$

In the above formula $a$ indicates the observed rotatory power; $l$ indicates the length of the tube in decimeters; and $c$ indicates the concentration.

EXAMPLE 5

One liter of an aqueous horse chestnut extract was treated with cholesterol to remove the hemolytic saponins. The flavonol glycosides and kryptoescin are present in the resulting extract in the proportion of 1:4. 10 g. of kryptoescin were isolated therefrom in the same manner as described in Example 2. The flavone glycosides eluted from the aluminum oxide as described in Example 2 were added to the hemolytic saponin- and kryptoescin-free extract to yield a therapeutically effective non-hemolytic horse chestnut extract which contained 2.5 g. of flavonol glycosides per liter.

EXAMPLE 6

Horse chestnut extract was treated with cholesterol and the resulting precipitate was mechanically separated from the liquid. The remaining extract contained 3% of dry residue and 150 mg. of kryptoescin in 50 cc. When administered in the form of an infusion, the extract was well tolerated on administration to humans. It was subdivided and filled into 5 cc. ampoules, each of which contained 15 mg. of kryptoescin A and B. To each of these ampoules 15 mg. of kryptoescin A isolated as described hereinabove were added. The resulting compositions had no harmful hemolytic or toxic effect on administration to humans.

The kryptoescins are capable of forming salts with inorganic bases such as with alkali metal and alkaline earth metal hydroxides, ammonia, and others as well as with organic bases such as the lower alkylamines and alkanolamines. Especially valuable salts are obtained with therapeutically effective bases which impart additional therapeutic effects thereto. Such bases are, for instance, the purine bases such as theophyllin, theobromin, caffeine, or derivatives of such purine bases and especially their readily water soluble derivatives, especially their hydroxy derivatives, and others. Antihistaminic bases which are capable of forming salts with weak acids; pyridine compounds such as nicotinic acid amide, isonicotinic acid hydrazide, and the like; phenyl alkylamines such as adrenalin, ephedrin, and the like; choline, and others. Salt formation is effected in a manner known to the art, for instance, by adding to the aqueous solution of kryptoescin the equivalent amount of the base and then evaporating the mixture to dryness.

It will be understood from the above that the present invention is not limited to the specific steps and to the proportions and other conditions specifically described above. For instance, the aqueous or aqueous-alcoholic horse chestnut extract can be prepared in any conventional manner and the saponins having harmful hemolytic effects can be removed from the extracts thus prepared in the above described manner by precipitation with cholesterol or in any other manner known to the art.

Many other changes in the starting extracts, the methods of isolating kryptoescin from said extracts and of purifying the same, of isolating and purifying the other therapeutically effective components of such horse chestnut extracts, of preparing pharmaceutical compositions to be used in therapy by parenteral administration, and the

We claim:
1. In a process of producing kryptoescin, the steps which comprise adding an acid to an aqueous horse chestnut extract free of cholesterol-precipitable saponins of harmful hemolytic activity so as to acidify said extract to a pH not exceeding a pH of 2.0, thereby causing precipitation of kryptoescin, and separating the resulting precipitate from the extract.

2. In a process of producing kryptoescin, the steps which comprise adding an acid to an aqueous horse chestnut extract free of cholesterol-precipitable saponins of harmful hemolytic activity so as to acidify said extract of a pH not exceeding a pH of 2.0, treating said acidified extract with an organic solvent selected from the group consisting of water-immiscible solvents and partly water-miscible solvents so as to extract the kryptoescin, separating the resulting kryptoescin solution in said organic solvent from the acidified extract, and isolating said kryptoescin from its solution.

3. In a process of producing kryptoescinol, the steps which comprise heating under reflux an aqueous solution of kryptoescin with dilute alkali hydroxide solution until splitting off of acetic acid and $\alpha$-methyl-$\beta$-hydroxy butyric acid is completed, filtering the turbid solution while hot, acidifying the filtrate by the addition of a mineral acid, and separating the precipitated kryptoescinol from the acid solution.

References Cited in the file of this patent
UNITED STATES PATENTS
2,790,793    Boedecker _____ Apr. 30, 1957

OTHER REFERENCES

Dispensatory of the U.S.A., 25th ed., 1955, Part II and III, p. 1533.